US007802355B2

(12) United States Patent
Spangenberg et al.

(10) Patent No.: US 7,802,355 B2
(45) Date of Patent: Sep. 28, 2010

(54) VIBRATION TABLE FOR CONCRETE MOULDING MACHINES

(75) Inventors: Erik Spangenberg, Østbirk (DK); Jesper B. Rasmussen, Brabrand (DK)

(73) Assignee: KVM Industrimaskiner A/S, Kjellerup (DK)

( * ) Notice: Subject to any disclaimer, the term of this patent is extended or adjusted under 35 U.S.C. 154(b) by 1210 days.

(21) Appl. No.: 10/563,500

(22) PCT Filed: Jul. 2, 2004

(86) PCT No.: PCT/DK2004/000473

§ 371 (c)(1), (2), (4) Date: Jan. 25, 2006

(87) PCT Pub. No.: WO2005/002328

PCT Pub. Date: Jan. 13, 2005

(65) Prior Publication Data

US 2006/0230595 A1 Oct. 19, 2006

(30) Foreign Application Priority Data

Jul. 4, 2003 (DK) .............................. 2003 01025

(51) Int. Cl.
*B23P 13/04* (2006.01)
*B28B 7/00* (2006.01)

(52) U.S. Cl. ..................... 29/527.5; 29/527.6; 425/421; 425/456; 425/432

(58) Field of Classification Search ................ 29/527.5, 29/527.1, 527.6; 249/120, 129, 132, 139, 249/160, 165, 166, 168; 425/193, 195, 421, 425/456, 432
See application file for complete search history.

(56) References Cited

U.S. PATENT DOCUMENTS 1,968,189 A * 7/1934 Bartels ........................ 249/18
1,984,564 A * 12/1934 Blackman .................... 249/91
4,063,859 A * 12/1977 Halle et al. ................. 425/139
5,067,358 A * 11/1991 Ancrenaz ....................... 74/61
6,342,750 B1 * 1/2002 Braungardt et al. .... 310/323.18
6,817,857 B2 * 11/2004 Spangenberg et al. ....... 425/254
7,014,161 B2 * 3/2006 Rampf et al. ............... 249/120
7,217,118 B2 * 5/2007 Womack ..................... 425/412
7,290,752 B2 * 11/2007 Keller ........................ 249/120

(Continued)

FOREIGN PATENT DOCUMENTS

WO WO 03/043792 5/2003

(Continued)

*Primary Examiner*—Essama Omgba
(74) *Attorney, Agent, or Firm*—James Creighton Wray; Meera P. Narasimhan

(57) ABSTRACT

Vibration equipment includes a vibration table with rotating shafts for producing vibrations and used in casting concrete blocks for e.g. paving and erection of walls. These vibration tables are normally made of cut-out, welded steel parts that after welding constitute the main part of the vibration table, making such vibration tables costly and resulting in relatively great waste of material. This method solves the above problems by providing vibration equipment in which individual parts for the vibration table are cast in one piece or are welded and are finally fastened to each other by bolts or by welding, thereby avoid several work operations and saving material in the form of steel. Simultaneously, the vibration table is designed such that force and stress flow in the vibration table is optimized.

12 Claims, 3 Drawing Sheets

U.S. PATENT DOCUMENTS 7,635,261 B2 * 12/2009 High et al. .................. 425/255
2002/0098258 A1 7/2002 Spangenberg et al.
2002/0134906 A1 9/2002 Braungardt et al.
2006/0182840 A1 * 8/2006 High et al. .................. 425/432

FOREIGN PATENT DOCUMENTS

WO WO 2005002328 A1 * 1/2005

* cited by examiner

PRIOR ART

VIBRATION TABLE FOR CONCRETE MOULDING MACHINES

BACKGROUND OF THE INVENTION

The present invention concerns a method for making a vibration table for concrete moulding machines of the kind typically used for making concrete blocks for paving and erecting walls, and a vibration table made by the method and for making concrete blocks.

US 20020098258, Spangenberg, discloses main frames having bottom and top frame parts for concrete moulding machines of the kind which are used in making slabs or blocks for covering surfaces and erecting walls are usually made by welding together cut standard steel sections of the types HEM, RHS, UNP, etc. The requirements to materials and welds at the making of bottom frames of this kind are high due to the fact that welded structures subjected to vibration only has 10-15% of the basic material strength in the welding zones. Thus, the main frame has a bottom frame part formed of two flame cut bottom plates arranged in parallel as an upper plate and a lower plate and forming the basic shape of the bottom, the bottom plates being interconnected by at least two longitudinal plates and a number of transverse plates. In this way, substantial savings are achieved as the main frame can be made with fewer or no welds in the critical areas, or with welds of a lower class.

Correspondent to US 20020098258, GB 2371515 discloses a main frame for a concrete block moulding apparatus of the kind used for making a concrete product in the form of blocks or slabs for covering surfaces and erecting walls and comprising a bottom frame member and a top frame member, which are mutually connected by columns and constituting support for a vibration arrangement for a concrete product, for a retainer arrangement for an upper mould part, for a concrete hopper and for a filling arrangement associated with the moulding apparatus, and where the main frame provide basis for column guides for parallel guiding of a mould and the retainer arrangement, is novel by that the bottom frame part is constituted by two flame cut bottom plates arranged in parallel as an upper plate and a lower plate and forming the basic shape of the bottom, the bottom plates being interconnected by at least two longitudinal plates and a number of transverse plates. Furthermore the top frame part is constituted by two flame cut plates which are arranged in parallel and interconnected by a suitable number of longitudinal and transverse plates. Yet further the longitudinal plates and the transverse plates are joined in a mortise joint so that the transverse plates extend to the edge of the upper and lower bottom plates through the longitudinal plates to form reinforced support for the bottom plates at the external side of the bottom frame member.

US 20020134906, Braungardt, discloses a mould frame for an apparatus for producing shaped concrete articles has two longitudinal and two transverse frame members which are detachably screwed to one another with form-fit on the four corners of the rectangular mould frame. The transverse frame members on their end faces have polygonal pins, which fit closely into the correspondingly shaped recesses of the longitudinal frame members to resist torsional movement. The polygonal pins and recesses are penetrated by one locking screw at a time with which the mould frame is braced in itself. A mould insert, which has several mould cavities, is braced within the mould frame by a tongue and groove connection. The form-fit screw connection between the longitudinal and transverse frame members makes it possible to accommodate the very high forces and torques, which are formed by shaking vibrations during the moulding process.

WO 03/043792 discloses a mould equipment for concrete casting and a method for making the mould equipment a method for making mould equipment for concrete casting machines of the kind typically used for making block bricks for pavement and wall construction. The mould equipment includes a lower part constituted by a mould table in which is provided at least one cell divided mould insert with cells that are open upwards as well as downwards, the cells defining the desired basic shape of individual bricks, and a corresponding upper part that includes a top rail from a top plate and projecting downwards pressing pistons in the shape of legs provided with foot plates, the undersides of which include lower thrust plates interacting with respective underlying cells in the lower part and thereby are useful counter hold for the castings during vibration and for downward ejection of the castings from the cells. The individual parts comprised by the mould equipment are cast in at least one casting process. This publication also relates to the mould equipment.

WO 88/06084 discloses a system for die casting of concrete goods such as block stones comprises a cellular casting mould having a plurality of cells and a device for supplying concrete for filling the cells. A dolly including a common base member with protruding piston portions having load plates of a shape corresponding to that of the cells, is used for compressing the concrete in the cells. Each of the piston portions includes a resilient compressible material arranged between the load plates and the common base member for obtaining uniform density and strength in the goods in the respective cells GB 2256165 discloses in connection with machines for moulding block stones a cellular mould used underneath a compacting head having press plates that can be pressed down for compressing the concrete mass in the moulding cells and for pressing out the moulded stone members when the mould is raised. The mould is fixed to lower carrier means and the compacting head to an overlying carrier head in a mutually accurately centred manner, which requires high accuracies in the making of holes for the spanner bolts, while also the mounting of the compacting head is difficult to carry out. According to the publication the compacting head is directly presented in the mould by means of distance pieces, and the entire mould unit thus preassembled, is moved into the space between the carrier head and the carrier means for the mould, where after the mould is secured to the carrier means. By the insertion of the mould unit into the said space a ‘floating’ engagement is established between co-acting holding portions at the lower side of the carrier head, and upon fixation of the mould working cylinders are actuated to pull up the holding portions of the carrier head for clamping the compacting head in its centred position. Thereafter the distance pieces are removed and the machine is ready for operation. Thus, the compacting head will be very easy to mount, and generally very coarse tolerances can be used.

The vibration table is used in the way that a mould bottom part is placed on a board disposed on the vibration table, with a mould top part situated in an elevated position above the bottom part. A concrete supply carriage is led in along the top side of the bottom part in the space below the top part for pouring concrete into the mould cells for filling these with concrete. After finishing filling, the supply carriage is pulled out, and the top part is lowered until the pressing plates abut on the concrete surfaces in the respective mould cells. Then the top part is utilised as a multiple pressing piston for compressing the concrete mass in the individual mould cells, which occurs under strong vibration of the mould equipment with the vibration table for separating air from the concrete mass. Hereby, the moulded items are compressed to the desired compact block shape and uniform thickness. Then the top part is kept at its final height relative to the bottom part, and the bottom part is forced to elevate from the board, whereby the mould items by the pressure maintained by the top part cannot participate in this elevation and will remain standing on the board during the form stripping. When the stripping has been finalised by displacing the bottom part up to a position in which its underside is elevated to the level of the pressing plates of the top part, the semi-solid mould items can be removed from the vibration table by pushing out the board therefrom after elevating the top part, after which a new moulding cycle can be commenced after lowering the bottom part to the board and lifting the top part to its starting position.

The process itself for making concrete products is a vibration process whereby very large vibration forces are imparted, acting on concrete as well as top part and bottom part of the mould. The vibration process is a chock vibration process, where the vibration table knocks on the mould plate from below.

Traditionally, the vibration table contains may welded parts. As a result of the said large vibrational forces, great demands are put on the welds used for joining the individual parts constituting the main part of the vibration table, a fact which i.a. entails that the production costs in connection with the making of the vibration table are relatively great. Furthermore, often there will be residual stresses in the material (steel) of which the vibration table is made after the welding procedures, resulting in a need for tempering/annealing before the vibration table is finally machined, assembled and put into use.

An example of a vibration table is shown in FIGS. 1 and 2, showing a traditionally made vibration table in assembled (FIG. 1) and exploded (FIG. 2) view, respectively.

It is obvious that such traditionally constructed vibration tables are even very costly to produce, as all part after cutting out from steel plate material, sharpening of items and welding together are to go through finishing before bearing housings, vibrator shafts with unbalancing blocks and wearing rails are assembled into the main part by bolting. The work operations are, as outlined, many and work intensive, and besides, in spite of optimisation attempts, there is a relatively great waste of material in connection with cutting out the parts.

It is the purpose of the invention to indicate a method for making a vibration table which at the same time is work saving in connection with making and which also provided the possibility of resource savings with regard to consumption of materials and energy. This purpose is achieved by a vibration table of the kind indicated in the introduction, which is characterised in that the individual parts included in the vibration table, such as top plate, side plates, box plates, reinforcing ribs, mounting flange and the flange are cast in at least one casting process.

The vibration table may thus consist of a plurality of cast elements that are mutually assembled by welding or by bolting.

The method for making the vibration table may also advantageously find application in connection with embodiments where the elements made by the casting process are combined with welded parts, meaning that the invention thus cannot be limited to the fact that all elements forming part of the making of the vibration table are cast in one casting process, as indicated below.

This is specified in the further advantageous method steps wherein the assembled single parts are assembled by welding, and that the vibration table is formed by the bed box finally being fastened to the top plate by bolts or by welding or alternatively in a further embodiment wherein the vibration table is built up by a combination of two cast and one welded individual parts, where the top plate with the ribs are cast in a common casting process, and where the reinforcement ribs and the mounting flange are cast in a second common casting process, and where the bed box is formed by welding side plates, bed plates and the flange together, and where the vibration table is formed subsequently by a succeeding bolting/welding together of the said cast and welded parts.

In another embodiment there is indicated a method of making the vibration table, where this consists of two cast single parts that are assembled by welding or by bolting together. The vibration table is cast as two individual parts, as the bed box for vibrator, which is constituted by side plates, bed plates and the flange, are cast in a first common casting process, and where the top plate with ribs, consisting of the top plate with the ribs and reinforcing ribs projecting down from the top plate and the mounting flange are cast in a second common casting process, and where the vibration table is formed subsequently by bolting/welding together of the individual parts formed by the first common casting process and the second common casting process.

In an embodiment where the method according to the invention is utilised to its uttermost, the entire vibration table can be cast in one and the same casting process. The vibration table which is constituted by a top plate with a number of ribs and plates projecting down from the underside of the top plate, forming a four-edged box of which two opposite sides are bed plates, four pieces support holders, disposed close to each corner of the vibration table for mounting balance blocks and a balancing block, are cast in one and the same casting process.

The invention is also directed at a vibration table, manufactured according to the inventive method disclosed above where a vibration table for concrete moulding machines of the kind used for making concrete blocks for paving and erecting walls and including a bed box for a vibrator consisting of side plates, bed plates and flange, and a top plate with ribs, consisting of a top plate the upwards facing side of which includes the ribs, and the underside of which includes reinforcing ribs, on the sides opposite the underside there is provided a mounting flange for fastening a bed box by a flange located on it, where the individual parts included in the vibration table, namely the top plate, the ribs, the side plates, the bed plates, the reinforcement ribs, the mounting flange and the flange, are constituted by at least one cast element and where wear area on the ribs, is provided with fitted hardened wearing rails after machining, and where further the vibration table is constituted by a combination of cast and welded single parts, as the bed box for vibrator, consisting of side plates bed plates and flange for fastening the bed box, is constituted by at least one cast element, and where the top plate with ribs, consisting of top plate with the ribs and reinforcing ribs projecting down from the underside of the top plate and mounting flange, is welded, and where the vibration table is formed by bolting/welding the bed box and the top plate.

In a further embodiment the vibration table is built up from a combination of two cast and one welded single parts, where the top plate with the ribs are constituted by at least one cast first element, and where the reinforcement ribs and the mounting flange are constituted by at least one second cast element, and where the bed box is formed by welded side plates, bed plates and the flange, and where the vibration table is formed by bolting/welding together of the said first and second cast elements and the welded part.

And in a still further embodiment the vibration table is constituted by at least two single elements, as the bed box for vibrator, which is constituted by side plates, bed plates and the flange, constitutes a first element, and where the top plate with ribs, consisting of the top plate with the ribs and of the reinforcing ribs projecting down from the underside of the top plate, and the mounting flange, constitutes the second element, and where the vibration table is formed subsequently by bolting/welding together of the first and the second elements, respectively.

And also in a still further advantageous embodiment the vibration table, which is constituted by a top plate with a number of ribs and plates projecting down from the underside of the top plate forming a four-edged box, of which two opposite sides are bed plates, four pieces support holders, disposed close to each corner of the vibration table for mounting balance blocks and a balancing weight block, is constituted by one element.

By the method according to the invention is achieved that only the material needed for making the said part is used, meaning a saving of materials in the form of the material otherwise cut from virgin plate material and discarded for scrapping. If utilised to its uttermost, a vibration table according to the invention will be a construction without any welds, and further the construction can be optimised with regard to stress induced from the forces transmitted from the rotating shafts to the vibration table and the reaction forces from the impact between the vibration table and the board, which other only will be possible by a very costly machining of the individual part in the welded vibration table. Besides, this does not only entail a substantial energy saving in the form of power otherwise used for welding, but also in the form of welding wire and power consumption in connection with relieving contamination in connection with performing the weldings. Furthermore, we are speaking of saving in energy, resources and contamination limiting measures in connection with the sub-supplier stage by the making of the steel plates otherwise used for making the vibration table, and for transporting the steel plates and annealing the vibration table.

With the purpose of achieving good durability of the vibration table, this may, like the known welded vibration tables be mounted with hardened wearing rails on the ribs, which are the part of vibration table knocking on the mould plate. The wear area on the ribs is provided with fitted hardened wearing rails after machining.

The vibration table will, after a long period of use, in spite of mounting the exchangeable hardened wearing parts, be so battered that it does no longer fulfil the intended purpose. In that connection, it will be relatively simple to reuse the worn-out vibration table as this is simply returned to the foundry that remelts the steel into a new vibration table. Thus we are here speaking of a product which is 100% recyclable.

DESCRIPTION OF DRAWING

The invention is explained more closely in the following with reference to the drawing, where:

FIGS. 1 and 2 show a traditionally built vibration table 2, in assembled and exploded view, respectively.

Figure 1:
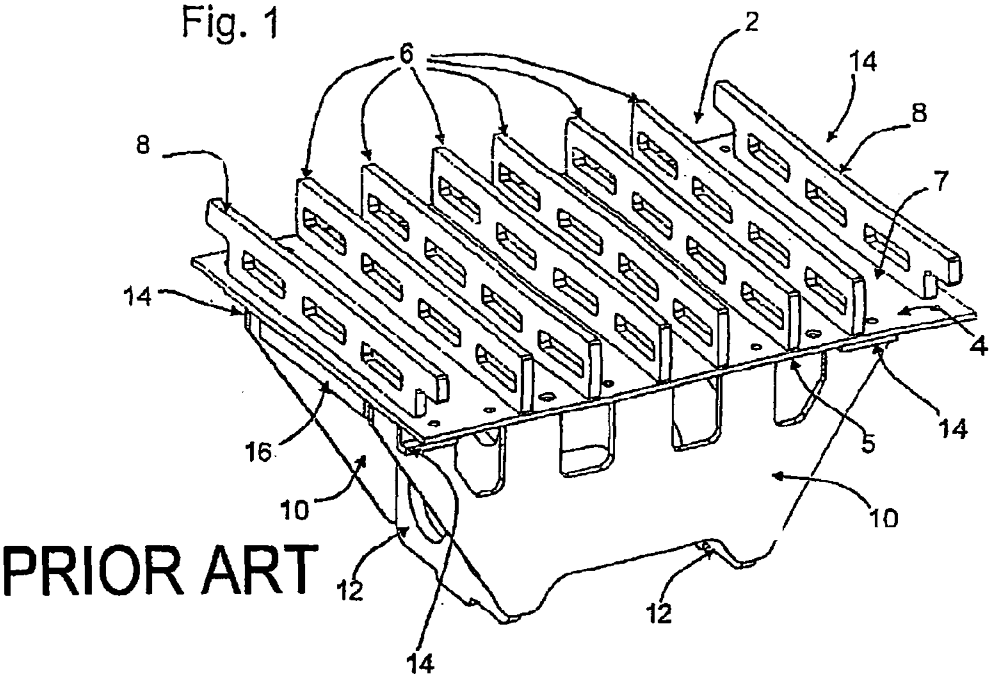
FIG. 1 is a perspective view of a prior art vibration table.
Figure 2:
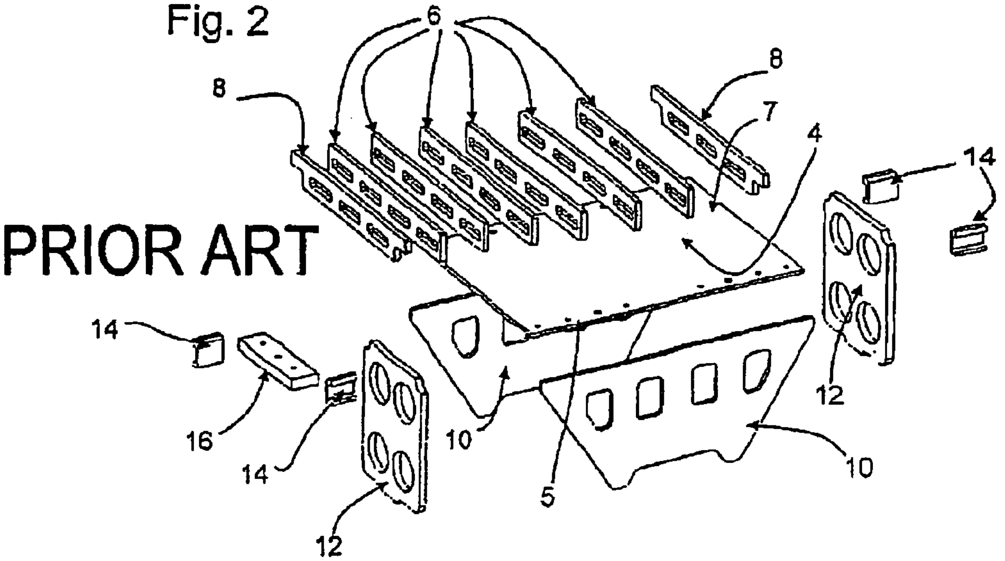
PRIOR ART Fig. 2
FIG. 2 is an exploded view of the vibration table shown in FIG. 1.

The vibration table 2 is traditionally constituted by a top plate 4 where from the top side 7 there is a number of ribs 6, 8. The underside 5 of the top plate has downwards projecting plates 10 and 12 that form a four-edged box where the two opposite sides 12 are bed plates to which the bearing housings (not shown) are bolted. In order to balance the vibration table, fittings 14 are welded, one at each corner, for mounting balancing blocks, and a weight block 16 is mounted (bolted) to the vibration table top plate 4 for compensating the coupling arrangement from the not shown vibrator shafts to the drive system driving the rotating vibrator shafts. Altogether, a vibration table of the prior art type includes quite a lot parts that are to be cut out at first and sharpened before they can be assembled by welding etc.

Figure 3:
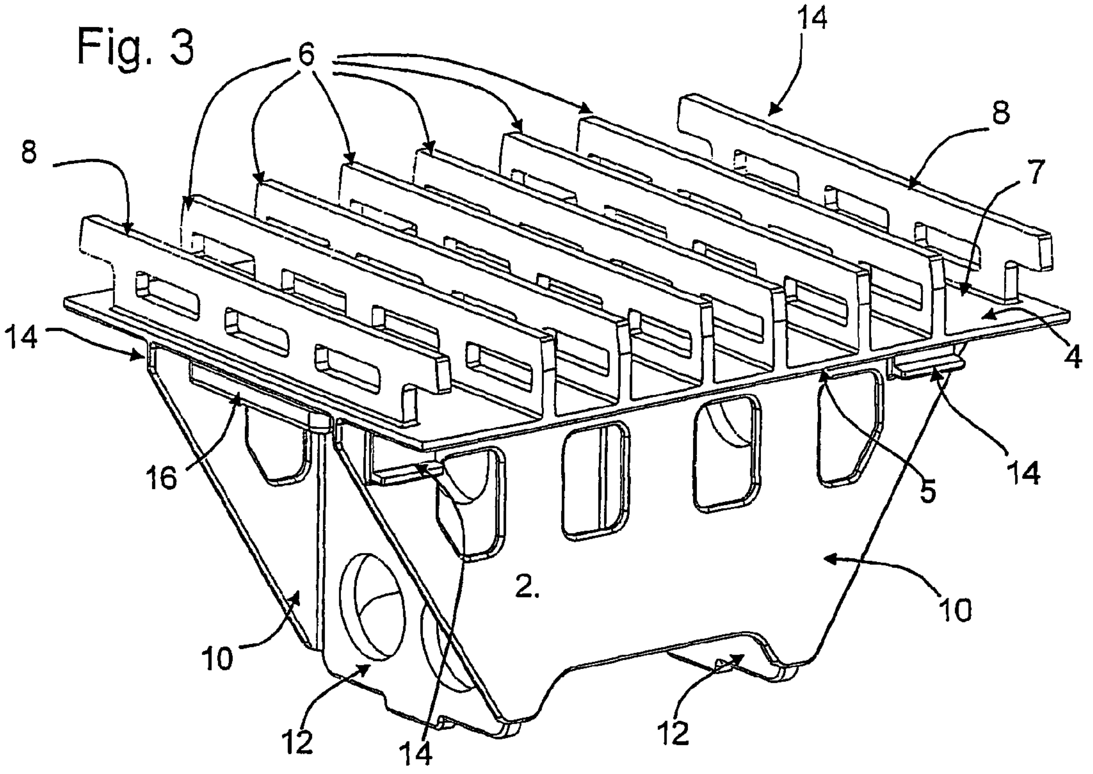
FIG. 3 is a perspective view seen obliquely from above of an embodiment of the vibration table according to the invention, in the most extreme form in that the vibration table is cast in one piece.

In FIG. 3 is shown an embodiment of a vibration table 2 according to the invention, where it is developed to its uttermost, as the entire vibration table is cast in one piece. I.e. the former individual elements, like the top plate 4 with the ribs 6 and 8, the plates 10 and 12 projecting downwards from the underside 5 of the top plate and forming a four-edged box, where the two opposite sides 12 are bed plates with holes for the bearing housings, the holders for the balancing blocks 14 and the balancing block 16, are cast in one and the same piece.

Figure 4:
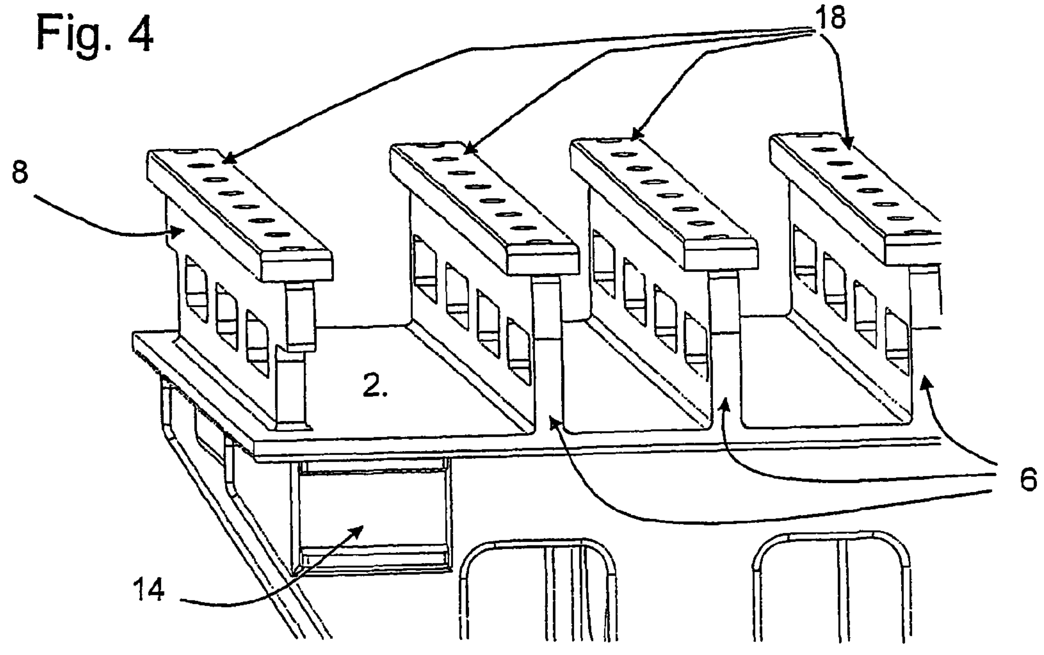
FIG. 4 shows a vibration table as in FIG. 3 with wearing rails fitted.

FIG. 4 shows how the hardened wearing rails 18 are mounted on the ribs 6 and 8. The mounting is typically effected by bolted joints so that it is easy to perform a substitution when the hardening has been worn off the wearing rails 18.

Figure 5:
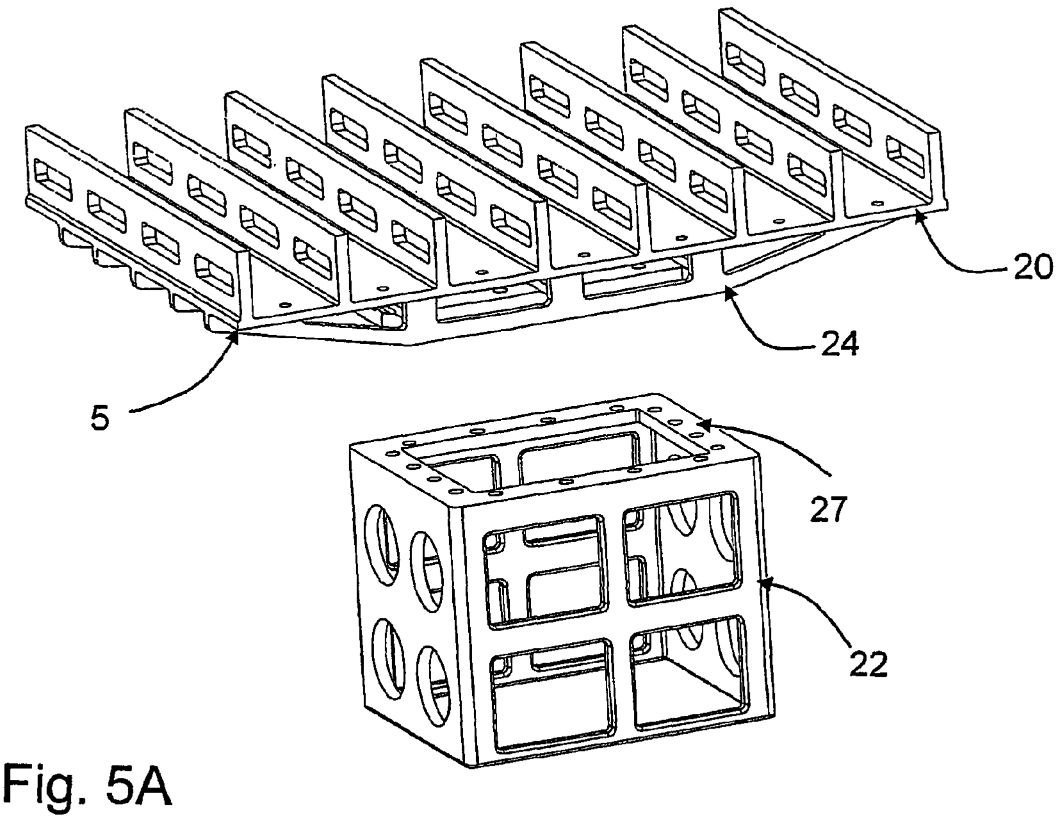
FIGS. 5 & 5A show a vibration table in two parts, a top plate with ribs 20 and a bed box 22 in which the bearing housings (not shown) and the vibrator shafts (not shown) are mounted, the two parts may either be cast, as shown here, alternatively, one part may be cast and the other part welded.
Figure 5A:
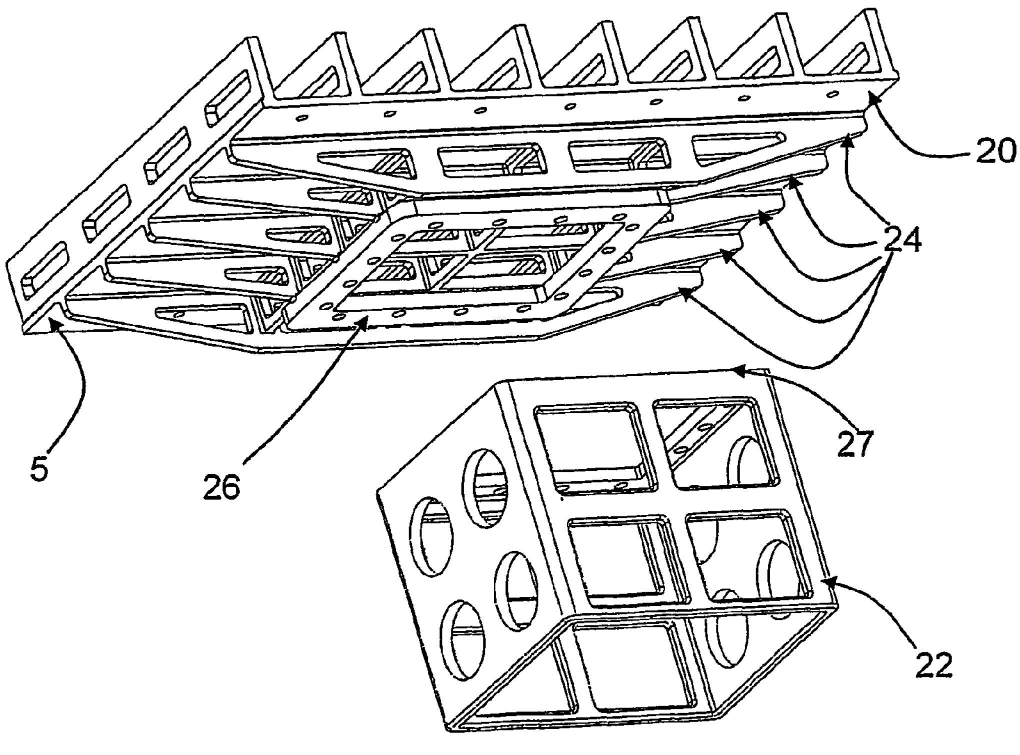

As it also appears from the stipulated claims, it will be possible to utilise the invention on more limited main parts, as indicated in FIGS. 5 and 5A, where a top plate with ribs 20 is shown, consisting of a top plate 4 with ribs 6 and 8 cast in one, and the box with the box plates 12 and the sides 10 being cast in one and the same item that subsequently can be mounted together by e.g. bolting. In this case, for the fastening to the bed box 22, reinforcing ribs 24 and a mounting flange 26 are cast at the underside 5 of the top plate, and for fastening the bed box 22 to the top plate 20 there is cast a flange 27 on the bed box 22.

The entire idea of casting the vibration table is primarily to remove welds from the elements forming part of the vibration table, and to optimise the construction itself with regard to the stress influence from the power transmission of the rotating shafts to the vibration table and the reactive forces from the impact between the vibration table and the board, the vibration process itself is a chock-vibration. Besides that the casting omits all welds which are very costly by themselves, it may also be achieved that the material can be disposed where it provides the greatest support, and at the same time is achieved the subsequent annealing of the welded vibration table simultaneously with achieving a saving in material.

The invention is thus very simply to cast the entire vibration table 2 in two pieces (FIG. 5) or in one piece (FIG. 3).

Furthermore, the vibration table can be recycled by remelting.

Summing up, it is very important to understand that the invention is not limited to the above described embodiments, but that the invention can be utilised in combination with welded parts, depending on which embodiments of the vibration table are desired, but this does not change the inventive aspect implied in the use of vibration tables cast solid in order to make vibration tables without any welds, with a resource consumption reduced by more than ⅓.

The invention claimed is:

1. A method of making a vibration table for concrete moulding machines used for making concrete blocks comprising a bed box for a vibrator including side plates, bed plates, and a top plate comprising ribs, forming parts of the vibration table, the ribs being on an upwards facing side of the top plate, reinforcing ribs on an underside of the top plate, a mounting flange on the underside of the top plate for fastening the bed box, the method comprising casting one or more of the parts comprising the bed box, the side plates, the bed plates, or the top plate in at least one casting process, building the vibration table from a combination of cast and assembled single parts, casting the bed box for the vibrator in one casting process, assembling the top plate, forming the vibration table by fastening the bed box to the top plate, and fitting wear areas on the ribs with hardened wearing rails after machining.

2. The method of making the vibration table of claim 1, wherein the assembled single parts are assembled by welding, and wherein the vibration table is formed by fastening the bed box finally to the top plate by bolts or by welding.

3. The method of making the vibration table of claim 1, wherein the vibration table is built up by a combination of two cast and one welded individual parts, and wherein the top plate with the ribs are cast in a first casting process and the reinforcement ribs and the mounting flange are cast in a second casting process, and wherein the bed box is formed by welding the side plates, bed plates and the flange together, and wherein the vibration table is formed subsequently by a succeeding bolting/welding together of the said cast and welded parts.

4. The method of making the vibration table of claim 1, wherein the vibration table is cast as two individual parts, as the bed box for vibrator, which is constituted by side plates, bed plates and the flange, are cast in a first casting process, and wherein the top plate with ribs, consisting of the top plate with the ribs and the reinforcing ribs projecting down from the top plate and the mounting flange are cast in a second casting process, and wherein the vibration table is formed subsequently by bolting/welding together of the individual parts formed by the first casting process and the second casting process.

5. The method of making the vibration table of claim 1, wherein the vibration table which is constituted by the top plate with a number of ribs and plates projecting down from the underside of the top plate, forming a four-edged box of which two opposite sides are bed plates, four pieces support holders, disposed close to each corner of the vibration table for mounting balance blocks and a balancing block, are cast in one and the same casting process.

6. The method of making the vibration table of claim 1, wherein the individual parts included by the vibration table comprising the top plate, ribs, the side plates, the bed plates, the reinforcing ribs, the mounting flange and the flange are cast in at least one casting process.

7. The method of making the vibration table of claim 1, wherein the vibration table is built up by a combination of cast and welded individual parts, the bed box for vibrator, consisting of side plates, bed plates and the flange for securing the bed box, is cast in a casting process, and where the top plate with ribs consisting of top plate with the ribs and the reinforcing ribs projecting down from the underside of the top plate and mounting flange are welded, and wherein the vibration table is formed by the bed box finally being fastened to the top plate with bolts or by welding.

8. A vibration table for concrete moulding machines used for making concrete blocks for paving and erecting walls and including a bed box for a vibrator consisting of side plates, bed plates, flange, and a top plate with ribs, forming parts of the vibration table, an upwards facing side of the top plate including the ribs and an underside of the top plate including reinforcing ribs, a mounting flange on sides opposite the underside for fastening a bed box by a flange located on it, wherein one or more of the individual parts included in the vibration table comprising the top plate, the ribs, the side plates, the bed plates, the reinforcement ribs, the mounting flange and the flange, are constituted by at least one cast element and wherein wear areas on the ribs are provided with fitted hardened wearing rails after machining.

9. The vibration table of claim 8, wherein the vibration table is constituted by a combination of cast and welded single parts, the bed box for vibrator, consisting of side plates, bed plates and flange for fastening the bed box, is constituted by at least one cast element, and wherein the top plate with ribs, consisting of top plate with the ribs and the reinforcing ribs projecting down from the underside of the top plate and mounting flange is welded, and wherein the vibration table is formed by bolting/welding the bed box and the top plate.

10. The vibration table of claim 8, wherein the vibration table is built up from a combination of two cast and one welded single parts, wherein the top plate with the ribs are constituted by at least one cast first element and the reinforcement ribs and the mounting flange are constituted by at least one second cast element, and wherein the bed box is formed by welded side plates, bed plates and the flange, and the vibration table is formed by bolting/welding together of the said first and second cast elements and the welded part.

11. The vibration table of claim 8, wherein the vibration table is constituted by at least two single elements, as the bed box for vibrator, which is constituted by side plates, bed plates and the flange, constitutes a first element, and where the top plate with ribs, consisting of the top plate with the ribs and of the reinforcing ribs projecting down from the underside of the top plate and the mounting flange, constitutes the second element, and wherein the vibration table is formed subsequently by bolting/welding together of the first and the second elements, respectively.

12. The vibration table of claim 8, wherein the vibration table, which are constituted by a top plate with a number of ribs and plates projecting down from the underside of the top plate forming a four-edged box, of which two opposite sides are bed plates, four pieces support holders, disposed close to each corner of the vibration table for mounting balance blocks and a balancing weight block, is constituted by one element.

* * * * *